US008638222B2

(12) United States Patent  
Soldan et al.

(10) Patent No.: US 8,638,222 B2
(45) Date of Patent: Jan. 28, 2014

(54) CONTROLLABLE DEVICE SELECTION BASED ON CONTROLLER LOCATION

(75) Inventors: Eric R Soldan, Saratoga, CA (US); Bradley R Pettit, Los Gatos, CA (US); Nosherwan Minwalla, Sunnyvale, CA (US); Nicolae Surpatanu, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 12/762,911

(22) Filed: Apr. 19, 2010

(65) Prior Publication Data

US 2011/0254683 A1 Oct. 20, 2011

(51) Int. Cl.
*G08B 21/00* (2006.01)

(52) U.S. Cl.
USPC ............ 340/539.13; 340/539.11; 340/539.22; 340/12.28; 348/14.05; 455/420

(58) Field of Classification Search
USPC ................. 340/539.1, 539.11–539.14, 539.2, 340/539.23, 12.2; 348/14.04, 14.05, 734; 455/418–420, 456.1, 457
See application file for complete search history.

(56) References Cited

U.S. PATENT DOCUMENTS

| 6,765,557 | B1 | 7/2004 | Segal et al. |
| 7,072,945 | B1 | 7/2006 | Nieminen et al. |
| 7,123,925 | B2 | 10/2006 | Robinson et al. |
| 2004/0095317 | A1 | 5/2004 | Zhang et al. |
| 2004/0121725 | A1* | 6/2004 | Matsui ......................... 455/3.06 |
| 2005/0096753 | A1* | 5/2005 | Arling et al. ..................... 700/11 |
| 2006/0109112 | A1* | 5/2006 | Haines ...................... 340/539.32 |
| 2006/0148518 | A1 | 7/2006 | Ferris |
| 2006/0161379 | A1 | 7/2006 | Ellenby et al. |
| 2007/0109133 | A1* | 5/2007 | Kister et al. ............... 340/573.1 |
| 2009/0319672 | A1 | 12/2009 | Reisman |
| 2010/0317332 | A1* | 12/2010 | Bathiche et al. .............. 455/418 |
| 2011/0037608 | A1* | 2/2011 | Hou et al. ................. 340/825.22 |
| 2011/0080529 | A1* | 4/2011 | Wong ............................. 348/734 |

OTHER PUBLICATIONS

Dachselt, et al., "Natural Throw and Tilt Interaction between Mobile Phones and Distant Displays", Retrieved at <<http://isgwww.cs.uni-magdeburg.de/cvse/Forschung/Publikationen/2009-CHI-Throw+Tilt.pdf>> Apr. 4-9, 2009, pp. 6.
"Foreign Office Action", Chinese Application No. 201110106247.8, (Jan. 31, 2013), 6 pages.
"Foreign Office Action", Chinese Application No. 201110106247.8, (Jun. 27, 2013), 9 pages.

* cited by examiner

*Primary Examiner* — Mohammad Ghayour
*Assistant Examiner* — Mark Rushing
(74) *Attorney, Agent, or Firm* — Wolfe-SBMC

(57) ABSTRACT

Controllable device selection based on controller location is described. In embodiments, a companion utility is executed by a portable device to interface the portable device with a selected one of multiple controllable devices via a wireless network. A location of the portable device can be determined based on a positioning unit that is integrated with the portable device. A controllable device can then be selected that is proximate the location of the portable device for input control of the controllable device via the wireless network.

19 Claims, 5 Drawing Sheets

CONTROLLABLE DEVICE SELECTION BASED ON CONTROLLER LOCATION

BACKGROUND

Current interaction with televisions, television set-top boxes, and/or other television devices generally involve a viewer controlling the devices with various remote controls. A typical home may include several televisions and/or television set-top boxes located throughout various rooms of the house. In addition, several different remote control devices are needed for all of the different brands and locations of the television devices. Typically, a user wanting to watch television enters a room of the house and needs to find the remote controls that correspond to the television and/or television set-top box that are located in the particular room of the house.

SUMMARY

This summary is provided to introduce simplified concepts of controllable device selection based on controller location, and the concepts are further described below in the Detailed Description. This summary is not intended to identify essential features of the claimed subject matter, nor is it intended for use in determining the scope of the claimed subject matter.

Controllable device selection based on controller location is described. In embodiments, a companion utility is executed by a portable device to interface the portable device with a selected one of multiple controllable devices via a wireless network. A location of the portable device can be determined based on a positioning unit that is integrated with the portable device. A controllable device can then be selected that is proximate the location of the portable device for input control of the controllable device via the wireless network. An orientation of the portable device may also be determined based on an orientation sensor that is integrated with the portable device, and the controllable device selected when the orientation of the portable device is towards the controllable device.

In other embodiments, position information of the multiple controllable devices is logged to identify that a controllable device is proximate the location of the portable device. The controllable device may be selected when the location of the portable device is within a perimeter that is defined to include the controllable device. The perimeter can be defined based on perimeter boundary inputs that are each received as an input to the portable device when the portable device is positioned at a perimeter boundary input location. In another embodiment, a graphical map that illustrates a layout of the perimeter and respective locations of the multiple controllable devices can also be displayed on the portable device.

BRIEF DESCRIPTION OF THE DRAWINGS

Embodiments of controllable device selection based on controller location are described with reference to the following drawings. The same numbers are used throughout the drawings to reference like features and components.

DETAILED DESCRIPTION

Figure 1:
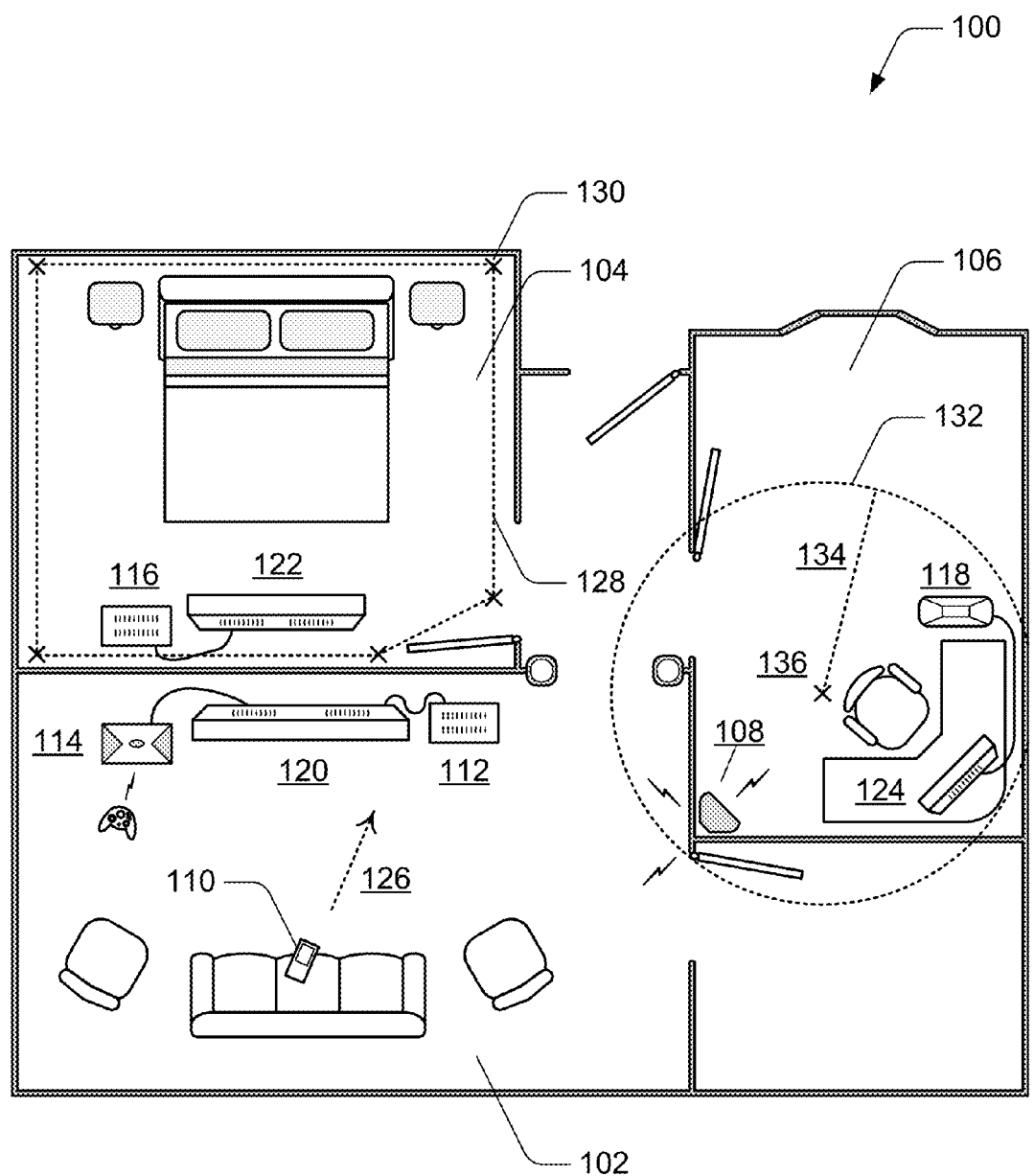
FIG. 1 illustrates an example environment in which embodiments of controllable device selection based on controller location can be implemented.

Controllable device selection based on controller location is described. Embodiments provide that one of various controllable devices, such as television set-top boxes in a home, can be selected based on a determined location of a portable device that is implemented as a controller. For example, a mobile phone may be implemented to function as a television remote control in a house that has multiple televisions and/or television set-top boxes, all within range of a wireless access point that provides wireless service throughout the rooms in the house. As a user moves around the house from one room to another, and when a television set-top box is proximate the location of the mobile phone, the television set-top box is selected for input control by the mobile phone. A companion utility is implemented as software on a portable device and can utilize positional and/or directional information corresponding to the portable device to automatically disambiguate which of the television set-top boxes to control based on the location of the portable device in the house.

In embodiments, a portable device can be integrated with a positioning unit, such as a GPS (Global Positioning System) unit, that indicates a location of the portable device within the various rooms of a house or business. As a user moves about the house carrying the portable device, the current GPS location is compared to the GPS locations of the television set-top boxes and other controllable devices in the home, and the relative distances can be used to determine a likely target device. In addition to a positioning unit, the portable device can also be integrated with an orientation sensor, such as a compass, from which an orientation of the portable device can be determined to further disambiguate a likely target device.

In additional embodiments, a location and orientation of a portable device may not provide enough information from which to determine and select a controllable device for input control from the portable device. In these instances, a perimeter can be defined that not only includes a particular controllable device, but also excludes other controllable devices. For example, a perimeter boundary can define an area, or subzone, within the wireless network that encompasses a room, a portion of a room, or multiple rooms in a house or business. Other positional and/or distance information may also be used to determine selection of a controllable device for input control by a portable device that implements a companion utility. For example, a controllable device may be selected based on an audio distinction that provides an indication of a distance from the portable device to the controllable device.

While features and concepts of the described systems and methods for controllable device selection based on controller location can be implemented in any number of different environments, systems, and/or various configurations, embodiments of controllable device selection based on controller location are described in the context of the following example systems and environments.

FIG. 1 illustrates an example environment 100 in which various embodiments of controllable device selection based on controller location can be implemented. The example environment 100 includes a representation of various rooms, such as in an apartment, house, or business. For purposes of this description, the various rooms are referred to as a living room 102, a bedroom 104, and an office 106. The office 106 includes a wireless access point 108 that implements a wireless network for wireless data communication throughout the various rooms of the building.

In embodiments, a portable device 110 can implement a companion utility that interfaces the portable device with a selected one of multiple controllable devices via the wireless network. A companion utility can be executed as a service on a device, or as a Web page in a browser application on a device that supports wireless data communication. The portable device can then communicate input controls to a controllable device via a wireless network. In embodiments, the multiple controllable devices can each implement a companion application that interfaces with the companion utility of the portable device.

The portable device 110 may be any type of wireless device implemented to receive and/or communicate wireless data, such as any one or combination of a mobile phone (e.g., cellular, VoIP, WiFi, etc.), a portable computer device, a remote control device, a media device (e.g., a personal media player, portable media player, etc.), and/or any other type of portable device. The portable devices described herein are not limited to wireless devices, and may include a wired, yet portable device. The portable device 110 can be implemented with any number and combination of differing components as further described with reference to the example portable device shown in FIG. 2.

The environment 100 also includes various examples of controllable devices, such as a television client device 112 (e.g., a television set-top box, a digital video recorder (DVR), etc.) and a gaming system 114 in the living room 102, an additional television client device 116 in the bedroom 104, and a computer device 118 in the office 106. Other controllable devices may include an appliance device, an electronic device, and/or any other type of client device or user device that may be implemented to receive control inputs from the portable device 110.

A client system can include a respective client device and display device that together render or playback any form of audio, video, and/or image media content, such as television programming For example, the television client device 112 and the gaming system 114 are connected to a display device 120 in the living room 102. Additionally, the television client device 116 is connected to a display device 122 in the bedroom 104, and the computer device 118 is connected to a display device 124 in the office 106. Any of the various display devices can be implemented as any type of a television, high definition television (HDTV), LCD, or similar display system.

Any of the various controllable devices can be configured and/or implemented with one or more processors, communication components, memory components, signal processing and control circuits, and a media content rendering system. Further, any of the controllable devices can be implemented with any number and combination of differing components as further described with reference to the example device shown in FIG. 5.

The portable device 110 can be implemented to include a positioning unit, such as a GPS (Global Positioning System) unit, that indicates a location of the portable device within any of the various rooms of the building. The portable device 110 may also include an orientation sensor, such as a compass, that indicates an orientation or a direction towards which the portable device is aimed or directed within any of the various rooms.

The portable device 110 implements a companion utility that can be implemented as computer-executable instructions and executed by one or more processors to implement the various embodiments and/or features described herein. The companion utility can be paired with the various controllable devices to interface the devices for data communication via the wireless network. The portable device 110 can be paired with a controllable device utilizing unique identifiers and/or codes that are entered manually or communicated between the devices for auto-pairing.

In addition to pairing the portable device 110 with the various controllable devices, the companion utility can log position information corresponding to the location of each of the multiple controllable devices in the various rooms. For example, the portable device 110 can be positioned next to a controllable device, such as when held or located proximate a controllable device, and an approximate location of the controllable device is logged based on a GPS location of the portable device. Alternatively, a user may input the coordinate locations of the controllable devices into the portable device 110 where the GPS and/or coordinate locations are stored for subsequent location reference.

In embodiments, the companion utility can determine a location of the portable device 110 from a positioning unit that is integrated with the portable device, and then select a controllable device that is proximate the location of the portable device for input control via the wireless network. In this example environment 100, the portable device 110 is shown located in the living room 102. The companion utility implemented by the portable device can determine the location of the portable device (e.g., as being located in the living room) and select the television client device 112 as the controllable device that is proximate the location of the portable device. When the controllable device is selected, the television client device 112 is configured for input control from the portable device. Alternatively or in addition to selecting a controllable device based on the location of the portable device, a controllable device may be selected based on an audio distinction that provides an indication of a distance from the portable device to the controllable device, such as to select a controllable device that is turned-on rather than a controllable device that is currently turned-off There may be instances when more than one controllable device is proximate the location of the portable device 110. For example, both the television client device 112 and the gaming system 114 are approximately equidistant to the location of the portable device 110 in the living room 102. The companion utility may then also determine an orientation of the portable device 110 from an orientation sensor that is integrated with the portable device, and select a controllable device that is proximate the location of the portable device and/or when the orientation of the portable device is towards the controllable device. In the example environment 100, the companion utility can select the television client device 112 as the controllable device that is proximate the location of the portable device and/or based on an orientation 126 of the portable device being directed towards the controllable device. The companion utility of the portable device can then select a different controllable device, such as the gaming system 114, when the location of the portable device changes and/or when the orientation of the portable device changes towards the different controllable device.

There may also be instances when more than one controllable device is proximate the location of the portable device 110, but the controllable devices are in separate rooms. For example, the gaming system 114 in the living room 102 is closely located to the television client device 116 in the bedroom 104, albeit separated by a wall. However, the companion utility of the portable device 110 may determine that both of the controllable devices are approximately equidistant to the location of the portable device based on logged location information corresponding to both of the controllable devices. Accordingly, additional embodiments provide that a perimeter can be defined that not only includes a particular controllable device, but also excludes other controllable devices. A perimeter boundary defines an area, or sub-zone, within the wireless network that encompasses the various rooms in example environment 100.

A perimeter may be established that includes a particular controllable device, and when the portable device 110 is within a boundary of the perimeter, the controllable device is selected for input control by the portable device. For example, a perimeter 128 is defined to encompass the bedroom 104 and the television client device 116 is within the boundary of the perimeter. The perimeter 128 can be defined based on perimeter boundary inputs 130, which are shown as Xs at corners of the perimeter boundary. The perimeter boundary inputs can each be received as an input to the portable device 110 when the portable device is positioned at a perimeter boundary input location. A boundary input can then be logged by the companion utility based on the GPS coordinates of the portable device 110 when held or positioned at a boundary input location. It should be noted that a perimeter can be defined based on any number of perimeter boundary inputs, such as the five inputs shown to define the perimeter 128. Alternatively or in addition, a perimeter boundary may be defined and/or detected utilizing RF, laser, or wireless signal reflection.

In an embodiment, a controllable device may be automatically activated when the portable device 110 enters into an area defined by a perimeter boundary. For example, the television client device 116 can automatically turn-on and/or tune to a favorite channel when the portable device 110 enters within the boundary of the perimeter 128. The companion utility may also incorporate other automatic selection information, such as if a user carries the portable device 110 near a kitchen television device in the morning, then tune the television device to local news and display a ticker that shows stock prices, local weather, or other information that may be of interest to the user.

The example environment 100 also includes another perimeter 132 that encompasses another of the controllable devices in the office 106. The computer device 118 can be selected for input control by the portable device 110 when the portable device enters within the boundary of the perimeter 132. As an alternative to multiple perimeter boundary inputs, such as used to define perimeter 128, the perimeter 132 is defined based on a radius 134 from a single center point 136 of the perimeter. The radius of a perimeter can be user-definable or automatically determined based on an approximate standard, such as a likely common room size. Similarly, a rectangular or square perimeter may be defined around a single central point.

Figure 2:
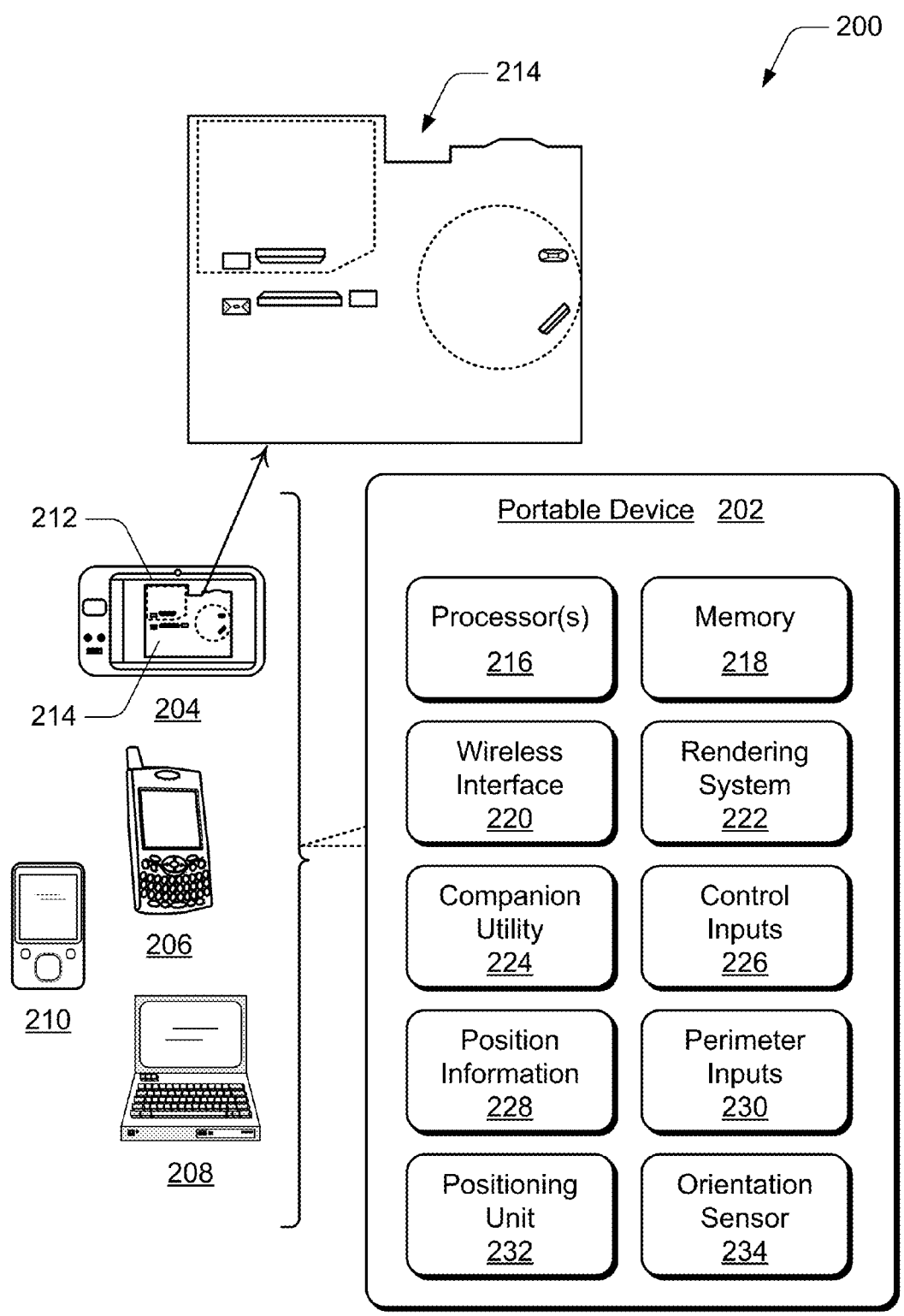
FIG. 2 illustrates example portable devices that can implement embodiments of controllable device selection based on controller location.

FIG. 2 illustrates an example 200 of various portable devices that can implement embodiments of controllable device selection based on controller location. A portable device 202 (e.g., a wired and/or wireless device) can be any one or combination of a mobile personal computer 204, a personal digital assistant (PDA), or a mobile phone 206 (e.g., cellular, VoIP, WiFi, etc.) that is implemented for data, messaging, and/or voice communications. A portable device 202 may also include a portable computer device 208 (e.g., a laptop computer, notebook, etc.), a media device 210 (e.g., a personal media player, portable media player, etc.), a gaming device, an appliance device, an electronic device, and/or any other type of portable device that can receive, display, and/or communicate data for input control of a controllable device.

Each of the various portable devices can include an integrated display and/or an integrated touch-screen, as well as selectable input controls via which a user can input data and/or selections. For example, mobile personal computer 204 includes an integrated touch-screen 212 on which a user interface can be displayed that includes displayable objects and/or user interface elements, such as any type of an icon, image, graphic, text, selectable button, user-selectable control, menu selection, map element, and/or any other type of user interface displayable feature or item.

In embodiments of controllable device selection based on controller location, a graphical map 214 can be displayed that illustrates a layout of perimeters and respective locations of the multiple controllable devices. For example, the graphical map 214 illustrates the two perimeters and the various controllable devices described with reference to FIG. 1. Alternatively or in addition, images of an area or room that includes a controllable device can also be mapped and displayed in the graphical map 214. In an embodiment, a defined perimeter that is displayed in the graphical map 214 may be modified by editing perimeter boundary points right on the display of the graphical map.

Any of the various portable devices described herein can be implemented with one or more sensors, processors, communication components, data inputs, memory components, storage media, processing and control circuits, and/or a rendering system. Any of the portable devices can also be implemented for communication via communication networks that may include any type of a data network, voice network, broadcast network, an IP-based network, and/or a wireless network that facilitates data, messaging, and/or voice communications. A portable device can also be implemented with any number and combination of differing components as described with reference to the example device shown in FIG. 5. A portable device may also be associated with a user (i.e., a person) and/or an entity that operates the device such that a portable device describes logical devices that include users, software, and/or a combination of devices.

In this example, portable device 202 includes one or more processors 216 (e.g., any of microprocessors, controllers, and the like), a memory 218, and a wireless interface 220 for data communications. Portable device 202 also includes a rendering system 222 to render user interfaces (e.g., the graphical map 214) and user interface elements for display on any of the portable devices. The rendering system 222 is also implemented to receive and render any form of audio, video, and/or image data received from any media content and/or data source.

Portable device 202 can also include various software and/or media applications that may incorporate components and/or modules that are processed or otherwise executed by the processors 216. The media applications can include a music and/or video player, a Web browser, an email application, a messaging application, a photo viewer, and the like. The software applications can also include an operating system and, in this example, a companion utility 224 to implement the various embodiments of controllable device selection based on controller location as described herein.

As described with reference to FIG. 1, the companion utility 224 selects one of multiple controllable devices for input control by the portable device, such as via control inputs 226. The companion utility 224 can also log position information 228 that corresponds to the location of each of the multiple controllable devices. Additionally, the companion utility 224 can log boundary perimeter inputs 230 to define the various perimeters. The portable device 202 may also include a positioning unit 232 and/or an orientation sensor 234. For example, the positioning unit 232 can be implemented as a GPS unit that indicates a location of the portable device, and the orientation sensor 234 can be implemented as a compass that indicates an orientation or a direction towards which the portable device is orientated. The companion utility can then select a controllable device that is proximate the location of the portable device and/or when the orientation of the portable device is towards the controllable device.

Example methods 300 and 400 are described with reference to respective FIGS. 3 and 4 in accordance with one or more embodiments of controllable device selection based on controller location. Generally, any of the functions, methods, procedures, components, and modules described herein can be implemented using software, firmware, hardware (e.g., fixed logic circuitry), manual processing, or any combination thereof A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
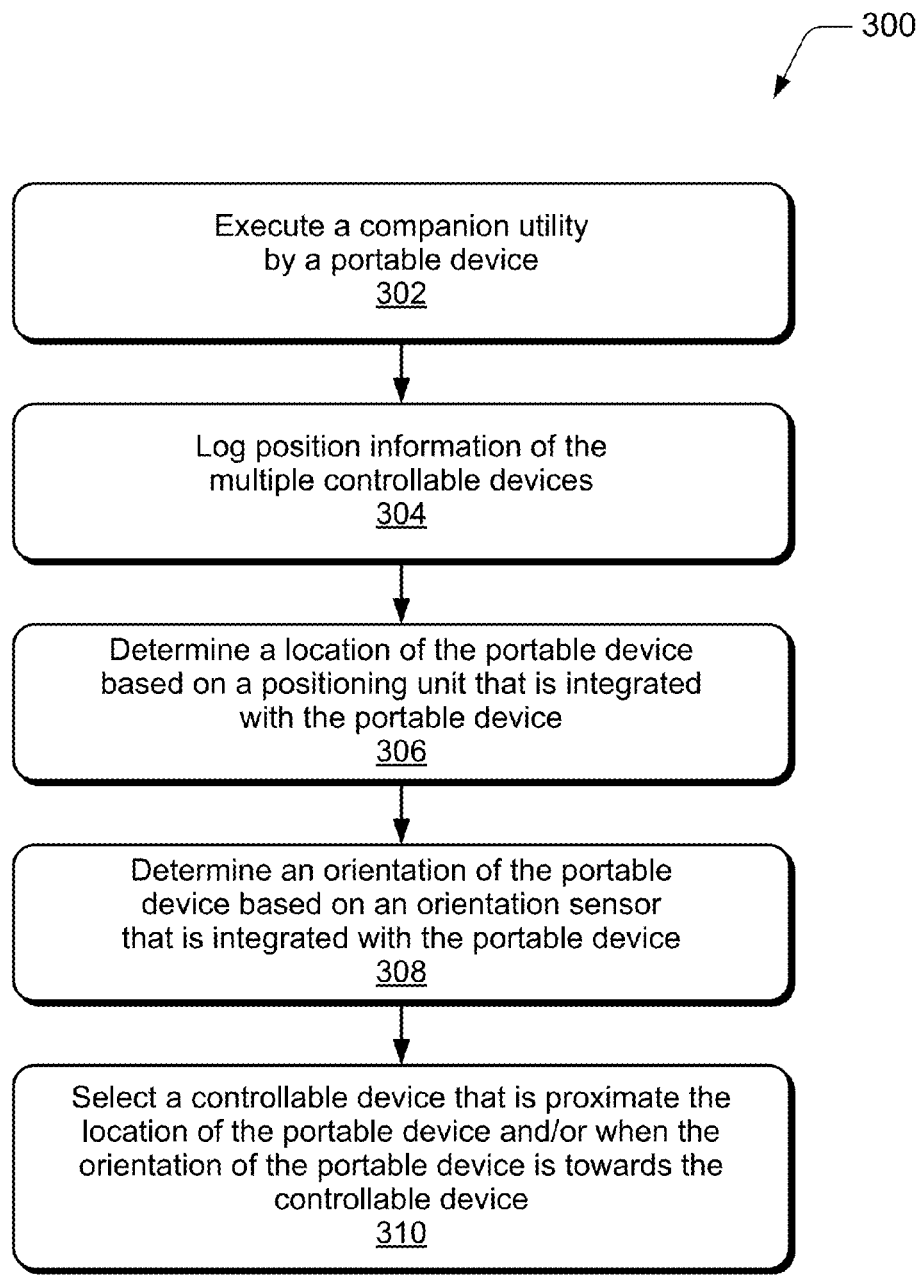
FIG. 3 illustrates example method(s) of controllable device selection based on controller location in accordance with one or more embodiments.

FIG. 3 illustrates example method(s) 300 of controllable device selection based on controller location. The order in which the method blocks are described are not intended to be construed as a limitation, and any number of the described method blocks can be combined in any order to implement a method, or an alternate method.

At block 302, a companion utility is executed by a portable device. For example, the portable device 110 executes the companion utility 224 to interface the portable device with a selected one of multiple controllable devices via a wireless network. The companion utility can be executed as a service on the portable device 110, and the companion utility interfaces the portable device with a companion application that is executed on a controllable device.

At block 304, position information of the multiple controllable devices is logged. For example, the companion utility 224 that is integrated with portable device 110 pairs the portable device 110 with the various controllable devices, and logs position information corresponding to the location of each of the multiple controllable devices, such as the location of each controllable device shown in the various rooms in the example environment 100.

At block 306, a location of the portable device is determined based on a positioning unit that is integrated with the portable device. For example, the companion utility 224 that is integrated with the portable device 110 determines the location of the portable device from a positioning unit 232 (e.g., a GPS unit) that is integrated with the portable device. The companion utility 224 can then identify a controllable device that is proximate the location of the portable device from the logged position information associated with the controllable device.

At block 308, an orientation of the portable device is determined based on an orientation sensor that is integrated with the portable device. For example, the companion utility 224 that is integrated with the portable device 110 determines an orientation of the portable device 110 from an orientation sensor 234 (e.g., a compass) that is integrated with the portable device.

At block 310, a controllable device is selected that is proximate the location of the portable device and/or when the orientation of the portable device is towards the controllable device. For example, the companion utility 224 that is integrated with the portable device 110 selects a controllable device for input control by the portable device via the wireless network. The controllable device is selected that is proximate the location of the portable device and/or when the orientation of the portable device is towards the controllable device. In the example environment 100, the companion utility can select the television client device 112 as the controllable device that is proximate the location of the portable device 110 and/or based on the orientation 126 of the portable device being directed towards the controllable device.

The method 300 can then continue at block 306 to determine a new location of the portable device for selecting a different controllable device based on a change in the location of the portable device, or when the orientation of the portable device changes towards the different controllable device. For example, the companion utility 224 of the portable device 110 selects a different controllable device, such as the gaming system 114, when the location of the portable device changes and/or when the orientation of the portable device changes towards the gaming system.

Figure 4:
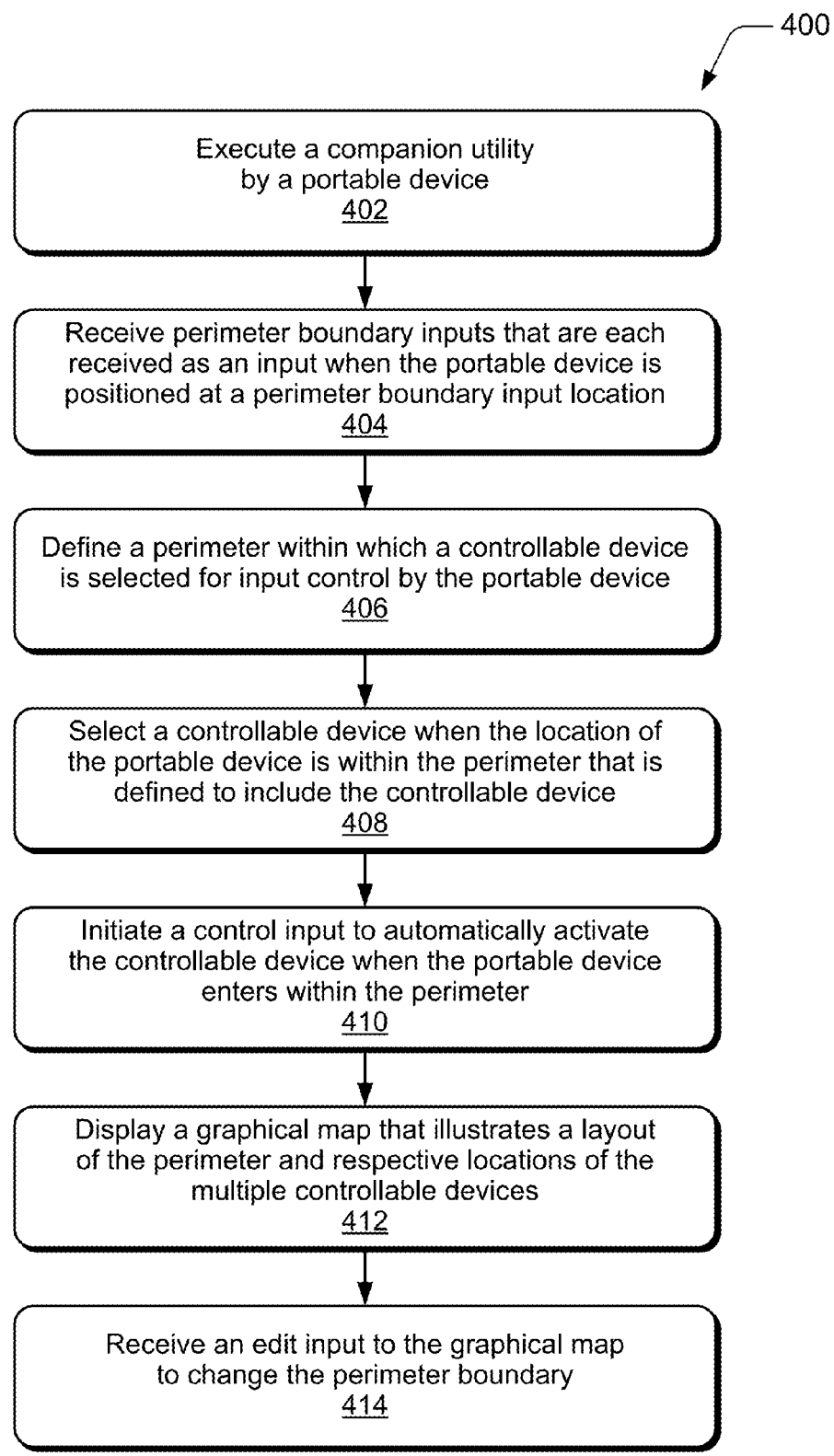
FIG. 4 illustrates additional example method(s) of controllable device selection based on controller location in accordance with one or more embodiments.

FIG. 4 illustrates example method(s) 400 of controllable device selection based on controller location. The order in which the method blocks are described are not intended to be construed as a limitation, and any number of the described method blocks can be combined in any order to implement a method, or an alternate method.

At block 402, a companion utility is executed by a portable device. For example, the portable device 110 executes the companion utility 224 to interface the portable device with a selected one of multiple controllable devices via a wireless network. The companion utility interfaces the portable device with a companion application that is executed on a controllable device.

At block 404, perimeter boundary inputs are each received as an input when the portable device is positioned at a perimeter boundary input location. For example, the portable device 110 receives inputs for a perimeter boundary as inputs to the portable device when the portable device is positioned at a perimeter boundary input location. A boundary input is logged by the companion utility based on the GPS coordinates of the portable device 110 when held or positioned at a boundary input location. In the examples, the portable device 110 receives the perimeter boundary inputs 130, which are shown as Xs at corners of the perimeter boundary for perimeter 128. Similarly, the portable device 110 receives a perimeter boundary input at the center point 136 of the perimeter 132.

At block 406, a perimeter is defined within which a controllable device is selected for input control by the portable device. For example, the perimeter 128 is defined based on the perimeter boundary inputs 130. The perimeter 128 is defined to encompass the bedroom 104 and the television client device 116 is within the boundary of the perimeter. Similarly, the perimeter 132 is defined based on the radius 134 from a single input at the center point 136 of the perimeter.

At block 408, a controllable device is selected when the location of the portable device is within the perimeter that is defined to include the controllable device. For example, when the portable device 110 is within the boundary of the perimeter 128, the television client device 116 (i.e., a controllable device) is selected for input control by the portable device. Similarly, when the portable device 110 is within the boundary of the perimeter 132, the computer device 118 (i.e., a controllable device) is selected for input control by the portable device.

At block 410, a control input is initiated to automatically activate the controllable device when the portable device enters within the perimeter. For example, the television client device 116 automatically turns-on and/or tunes to a favorite channel when portable device 110 enters within the boundary of the perimeter 128. Similarly, computer device 118 may automatically turn-on and/or initiate browsing to a home page for display on display device 124 when portable device 110 enters within the boundary of the perimeter 132.

At block 412, a graphical map is displayed that illustrates a layout of the perimeter and respective locations of the multiple controllable devices. For example, the graphical map 214 is displayed that illustrates a layout of the perimeters and respective locations of the multiple controllable devices, such as the two perimeters and the various controllable devices described with reference to FIG. 1. At block 414, an edit input to the graphical map is received to change the perimeter boundary. For example, an edit input to the displayed graphical map 214 is received at the portable device 110 and a boundary input 130 of the perimeter 128 is modified to redefine the boundary of the perimeter.

Figure 5:
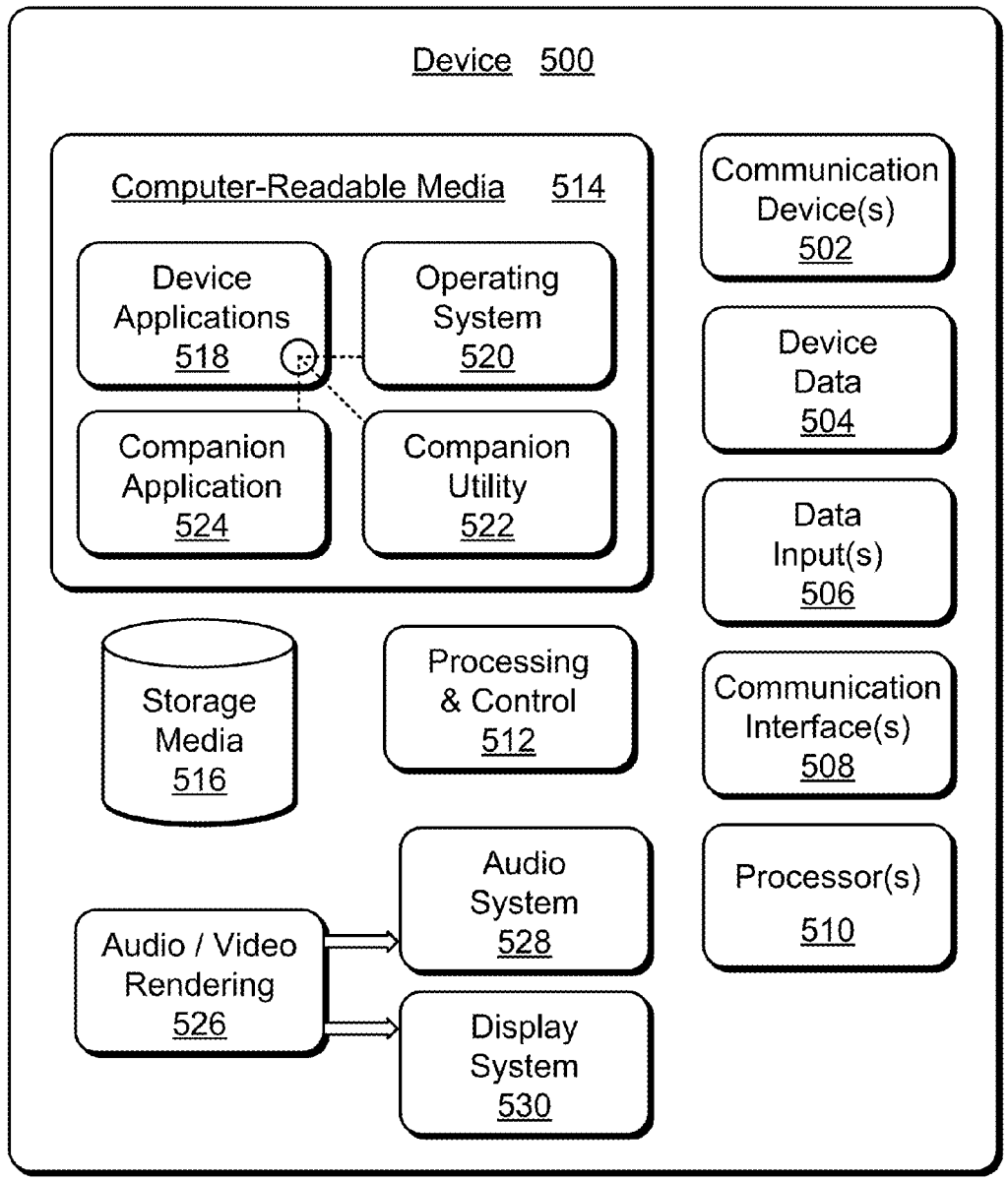
FIG. 5 illustrates various components of an example device that can implement embodiments of controllable device selection based on controller location.

FIG. 5 illustrates various components of an example device 500 that can be implemented as any type of portable, controllable, and/or computing device as described with reference to the previous FIGS. 1-4 to implement embodiments of controllable device selection based on controller location. In embodiments, device 500 can be implemented as any one or combination of a wired and/or wireless device, as any form of television client device (e.g., television set-top box, digital video recorder (DVR), etc.), consumer device, computer device, server device, portable computer device, user device, communication device, video processing and/or rendering device, appliance device, gaming device, electronic device, and/or as any other type of device. Device 500 may also be associated with a user (i.e., a person) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of controllable device selection based on controller location. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable storage media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable storage media 514 provides data storage mechanisms to store the device data 504, as well as various device applications 518 and any other types of information and/or data related to operational aspects of device 500. For example, an operating system 520 can be maintained as a computer application with the computer-readable storage media 514 and executed on processors 510. The device applications 518 can include a device manager (e.g., a control application, software application, signal processing and control module, code that is native to a particular device, a hardware abstraction layer for a particular device, etc.).

The device applications 518 also include any system components or modules to implement embodiments of controllable device selection based on controller location. In this example, the device applications 518 can include a companion utility 522, such as when the device 500 is implemented as a portable device. Alternatively or in addition, the device applications 518 can include a companion application 524, such as when the device 500 is implemented as a controllable device. The companion utility 522 and the companion application 524 are shown as software modules and/or computer applications. Alternatively or in addition, the companion utility 522 and/or the companion application 524 can be implemented as hardware, software, firmware, or any combination thereof Device 500 also includes an audio and/or video rendering system 526 that generates and provides audio data to an audio system 528 and/or generates and provides display data to a display system 530. The audio system 528 and/or the display system 530 can include any devices that process, display, and/or otherwise render audio, display, and image data. Display data and audio signals can be communicated from device 500 to an audio device and/or to a display device via an RF (radio frequency) link, S video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Although embodiments of controllable device selection based on controller location have been described in language specific to features and/or methods, it is to be understood that the subject of the appended claims is not necessarily limited to the specific features or methods described. Rather, the specific features and methods are disclosed as example implementations of controllable device selection based on controller location.

The invention claimed is:

1. A portable device, comprising:
   a positioning unit configured to indicate a location of the portable device;
   an integrated display configured to display a graphical map that illustrates a layout of an area and respective locations of multiple controllable devices;
   at least a memory and a processor that implement a companion utility configured to interface the portable device with a selected one of the multiple controllable devices via a wireless network, the companion utility further configured to:
   define a perimeter of the area based on perimeter boundary inputs to the portable device;
   receive an edit input to the graphical map to redefine the perimeter of the area effective to create a redefined perimeter of the area that includes at least one of the multiple controllable devices;
   determine the location of the portable device from the positioning unit; and
   select the controllable device when the location of the portable device is within the redefined perimeter for input control of the controllable device via the wireless network.

2. The portable device as recited in claim 1, wherein the positioning unit is a GPS unit.

3. The portable device as recited in claim 1, further comprising:
   an orientation sensor configured to indicate an orientation of the portable device;
   wherein the companion utility is further configured to:
      select the controllable device when the orientation of the portable device is towards the controllable device; and
      select a different one of the multiple controllable devices when the orientation of the portable device changes towards the different controllable device.

4. The portable device as recited in claim 1, wherein the multiple controllable devices include at least one of a television set-top box, a gaming system, or a client device.

5. The portable device as recited in claim 1, wherein the companion utility is further configured to log position information of the multiple controllable devices to identify that the controllable device is proximate the location of the portable device.

6. The portable device as recited in claim 1, wherein the companion utility is further configured to:
   define the perimeter of the area based on the perimeter boundary inputs that are each received as a user input to the portable device when the portable device is positioned at a perimeter boundary input location.

7. The portable device as recited in claim 1, wherein the companion utility is configured to automatically activate the controllable device when the portable device enters into the area defined by the redefined perimeter.

8. The portable device as recited in claim 1, wherein the companion utility is configured to exclude control of an additional controllable device that is not within the area defined by the redefined perimeter.

9. A method implemented by a portable device, the method comprising:
   executing a companion utility with a processor of the portable device, the companion utility configured to interface the portable device with a selected one of multiple controllable devices via a wireless network;
   determining a location of the portable device based on a positioning unit that is integrated with the portable device;
   defining a perimeter of an area based on perimeter boundary inputs that are each received as a user input to the portable device when the portable device is positioned at a perimeter boundary input location;
   displaying a graphical map that illustrates a layout of the defined perimeter;
   receiving an edit input to the graphical map to redefine the defined perimeter effective to create a redefined perimeter; and
   selecting the selected one of the multiple controllable devices when the location of the portable device is within the redefined perimeter for input control of the controllable device via the wireless network.

10. The method as recited in claim 9, further comprising:
    determining an orientation of the portable device based on an orientation sensor that is integrated with the portable device; and
    selecting the controllable device when the orientation of the portable device istowards the controllable device.

11. The method as recited in claim 10, further comprising selecting a different one of the multiple controllable devices when the orientation of the portable device changes towards the different controllable device.

12. The method as recited in claim 9, further comprising logging position information of the multiple controllable devices to identify that the controllable device is proximate the location of the portable device.

13. The method as recited in claim 9, wherein the graphical map illustrates the redefined perimeter and respective locations of the multiple controllable devices.

14. The method as recited in claim 9, further comprising initiating a control input to automatically activate the controllable device when the portable device enters within the area defined by the redefined perimeter.

15. The method as recited in claim 9, further comprising excluding control of an additional controllable device that is not within the redefined perimeter.

16. A system, comprising:
    multiple controllable devices configured to render television media content for display;
    a portable device configured for input control of at least one of the multiple controllable devices that is proximate a location of the portable device, the location of the portable device being determinable from a positioning unit that is integrated with the portable device, the portable device configured to:
    define a perimeter of an area based on perimeter boundary inputs that are each received as a user input to the portable device when the portable device is positioned at a perimeter boundary input location;
    display a graphical map that illustrates a layout of the defined perimeter;

receive an edit input to the graphical map to redefine the defined perimeter effective to create a redefined perimeter;

select the controllable device for the input control when the location of the portable device is within the redefined perimeter that is defined to include the controllable device; and a wireless network configured to interface the portable device with the controllable device via wireless data communication.

17. The system as recited in claim 16, wherein the portable device is further configured to said select the controllable device for the input control when an orientation of the portable device is towards the controllable device.

18. The system as recited in claim 16, wherein the portable device is configured to automatically activate the controllable device when the portable device enters into the area defined by the redefined perimeter.

19. The system as recited in claim 16, wherein the portable device is configured to exclude control of an additional controllable device that is not within the redefined perimeter.

* * * * *